United States Patent
Drumm et al.

(10) Patent No.: US 9,415,758 B2
(45) Date of Patent: Aug. 16, 2016

(54) METHOD FOR PROVIDING HAPTIC INFORMATION TO THE DRIVER OF A MOTOR VEHICLE

(71) Applicant: CONTINENTAL TEVES AG & CO. OHG, Frankfurt (DE)

(72) Inventors: Stefan Drumm, Saulheim (DE); Steffen Linkenbach, Eschborn (DE); Marco Besier, Bad Schwalbach (DE); Jürgen Böhm, Oberneisen (DE); Georg Roll, Frankfurt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 10 days.

(21) Appl. No.: 14/385,537

(22) PCT Filed: Mar. 20, 2013

(86) PCT No.: PCT/EP2013/055761
§ 371 (c)(1),
(2) Date: Sep. 16, 2014

(87) PCT Pub. No.: WO2013/139825
PCT Pub. Date: Sep. 26, 2013

(65) Prior Publication Data
US 2015/0061854 A1    Mar. 5, 2015

(30) Foreign Application Priority Data

Mar. 22, 2012  (DE) .......................... 10 2012 204 564
Mar. 5, 2013   (DE) .......................... 10 2013 203 710
Mar. 19, 2013  (DE) .......................... 10 2013 204 778

(51) Int. Cl.
*B60Q 1/00*     (2006.01)
*B60T 17/22*    (2006.01)
(Continued)

(52) U.S. Cl.
CPC . *B60T 17/22* (2013.01); *B60T 7/04* (2013.01); *B60T 7/042* (2013.01); *B60T 8/4081* (2013.01); *B60T 13/686* (2013.01); *B60T 13/745* (2013.01); *G08B 6/00* (2013.01); *B60K 1/00* (2013.01); *B60T 2270/82* (2013.01); *G08B 1/00* (2013.01)

(58) Field of Classification Search
CPC .................................. G08B 1/00; B60K 1/00
See application file for complete search history.

(56) References Cited

U.S. PATENT DOCUMENTS 4,655,511 A * 4/1987 Leiber .................... B60T 7/042
                                                   303/113.4
4,776,643 A   10/1988 Leiber
(Continued)

FOREIGN PATENT DOCUMENTS

DE    3409705    9/1985
DE    3427358    2/1986
(Continued)

OTHER PUBLICATIONS

International Search Report for PCT/EP2013/055761 mailed Sep. 16, 2013.
(Continued)

Primary Examiner — Shirley Lu
(74) Attorney, Agent, or Firm — RatnerPrestia

(57) ABSTRACT

The invention relates to a method for providing haptic information to the driver of a motor vehicle, equipped with a brake-by-wire brake system, about the operating state of the brake system, in which method the brake pedal characteristic is generated by a pedal travel simulator, in the form of a functional relationship between the brake pedal opposing force and the brake pedal travel, and is modified as a function of an operating state. In order to provide the driver with the haptic information channel via which electronically controlled information can be communicated to the driver during braking, without the impression of a defect arising, the invention proposes that a basic brake pedal characteristic is generated by a passive simulator spring which assigns pedal travel, on which pedal return travel transporting the haptic information is superimposed, to a given pedal force in an unchanging, constant relationship.

15 Claims, 3 Drawing Sheets

(51) Int. Cl.
   *B60T 7/04*     (2006.01)
   *B60T 8/40*     (2006.01)
   *B60T 13/74*    (2006.01)
   *B60T 13/68*    (2006.01)
   *G08B 6/00*     (2006.01)
   *G08B 1/00*         (2006.01)
   *B60K 1/00*         (2006.01)

(56) References Cited

U.S. PATENT DOCUMENTS

| | | |
|---|---|---|
| 5,261,730 A | 11/1993 | Steiner |
| 2008/0284242 A1* | 11/2008 | Ganzel ..................... B60T 7/12 303/114.1 |
| 2011/0054756 A1 | 3/2011 | Hecker |

FOREIGN PATENT DOCUMENTS

| | | |
|---|---|---|
| DE | 4102497 | 5/1992 |
| DE | 10039670 | 3/2002 |
| DE | 10262003 | 3/2004 |
| DE | 10346674 | 1/2005 |
| DE | 102004040616 | 2/2006 |
| DE | 102006026873 | 12/2007 |
| WO | 2009124739 | 10/2009 |

OTHER PUBLICATIONS

German Search Report mailed Nov. 18, 2013 in counterpart German Application No. 10 2013 204 778.9, including partial translation.
Written Opinion of the International Searching Authority for International Application No. PCT/EP2013/055761, including English translation.

* cited by examiner

METHOD FOR PROVIDING HAPTIC INFORMATION TO THE DRIVER OF A MOTOR VEHICLE

CROSS REFERENCE TO RELATED APPLICATIONS

This application is the U.S. National Phase Application of PCT/EP2013/055761, filed Mar. 20, 2013, which claims priority to German Patent Application Nos. 10 2012 204 564.3, filed Mar. 22, 2012, 10 2013 203 710.4, filed Mar. 5, 2013 and 10 2013 204 778.9, filed Mar. 19, 2013, the contents of such applications being incorporated herein by reference.

FIELD OF THE INVENTION

The present invention relates to a method for providing haptic information to the driver of a motor vehicle, which is equipped with a brake-by-wire brake system, about the operating state of the brake system, in which the brake pedal characteristic is generated in the form of a functional relationship between the brake pedal opposing force and the brake pedal travel, by a simulator, and is modified as a function of the operating state, and a device for carrying out the method according to the invention.

BACKGROUND OF THE INVENTION

Document DE 34 09 705 A1, which is incorporated by reference, discloses a method for providing feedback about disruptions or faults during a braking process during which a fault reaction-actuating device acts on the brake pedal travel simulator in such a way that a change in the brake pedal characteristic predefined by the brake pedal travel simulator occurs and remains until the provided function of the by-wire system is available again. Furthermore, it is proposed to change the brake pedal characteristic preferably in such a way that rhythmic pulsating of the brake pedal occurs. For this purpose, an electromagnetic actuator which is actuated with the pulsating signal of an electronic oscillatory circuit is to engage with a locking projection in a mechanism with which the simulator characteristic can be modified. The locking projection is designed to enter into a locking operative connection with a sliding piece on which a spring is supported by means of which part of the pedal force is transmitted. A technical teaching such as how pulsating of the brake pedal is to be generated by means of periodic activation of the locking is not provided. In order to permit periodic pedal movement, once an additional pedal travel has been enabled it must be capable of being reset again. A corresponding pedal actuating device and its supply with actuating energy would accordingly still have to be added.

German laid-open patent application DE 10 2006 026 873 A1, which is incorporated by reference, describes an activation device for a by-wire brake system. In order to provide the driver with haptic feedback about a relatively low coefficient of adhesion or friction at the vehicle wheels or a start of ABS control, the brake pedal axle is provided with an electrical, hydraulic or pneumatic rotary drive which generates pulsations at the brake pedal. In this context, the amplitude of the pulsations can be changed in a range between approximately 0 mm and approximately 5.0 mm, and the frequency thereof between approximately 1 Hz and approximately 10 Hz.

Finally, document DE 10 2004 040 616 A1, which is incorporated by reference, discloses a method for providing haptic information to the driver of a motor vehicle, which is equipped with a brake-by-wire brake system, about the operating state of the brake system, in which a brake pedal characteristic is generated in the form of a functional relationship between the brake pedal opposing force and the brake pedal travel, by a simulator, and is modified as a function of the operating state, as well as a device for carrying out the method. An opposing force, which counteracts the activation force applied to the brake pedal by the driver's foot is generated by an active pedal travel simulator, specifically in such a way that the driver senses this as a limitation of the comfort and/or functioning of the brake system.

Such limitation of the comfort and a sensed limitation of functioning are not acceptable if the driver is to be informed about the operating state of an intact brake system.

SUMMARY OF THE INVENTION

An aspect of the present invention proposes a method which makes available a haptic information channel, in particular, with simple electronic means, by means of which haptic information channel information can be communicated to the driver in an electronically controlled fashion during a braking operation without the impression of a defect being produced.

This is achieved according to the invention by a method for providing haptic information to the driver of a motor vehicle, which is equipped with a brake-by-wire brake system, about the operating state of the brake system, in which a brake pedal characteristic is generated in the form of a functional relationship between the brake pedal opposing force and the brake pedal travel, by a simulator, and is modified as a function of the operating state wherein a basic brake pedal characteristic is generated by a passive simulator spring which assigns a pedal travel to a given pedal force in an unchangingly constant relationship, on which pedal travel a pedal return travel which transports the haptic information is superimposed. It is particularly advantageous here that in order to apply the opposing force predominantly components of the brake-by-wire brake system are used which are present in any case for correct operation of the brake system.

DETAILED DESCRIPTION OF THE INVENTION

Figure 1:
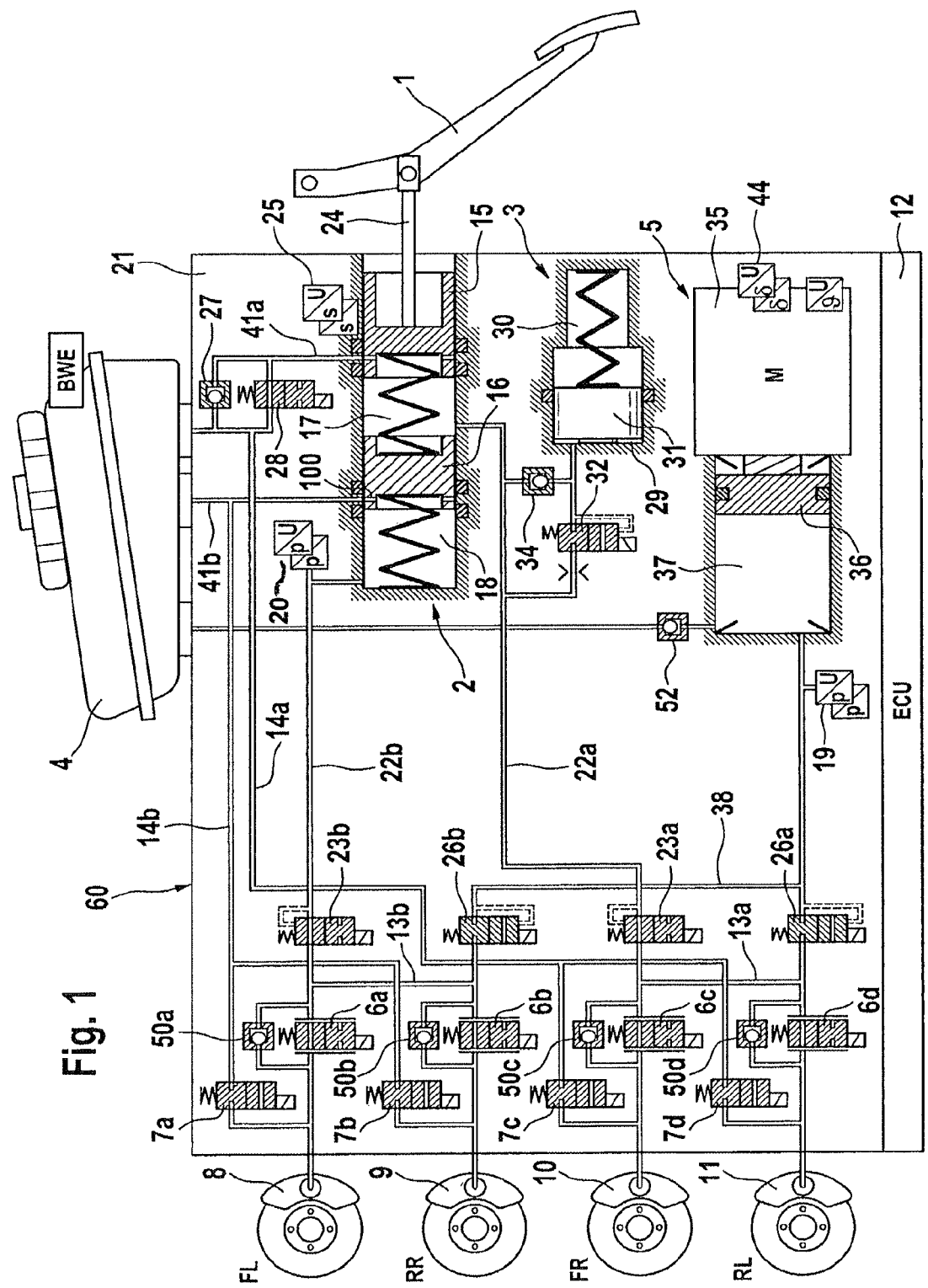
FIG. 1 shows a hydraulic circuit diagram of an exemplary brake system for carrying out the method according to an aspect of the invention.

The brake system illustrated in the drawing comprises essentially a hydraulic activation unit 2 which can be activated by means of an activation or brake pedal 1, a travel simulator or simulation device 3 which interacts with the hydraulic activation unit 2, a pressure medium reservoir container 4 which is assigned to the hydraulic activation unit 2 and is at atmospheric pressure, an electrically controllable pressure supply device 5, an electronic open-loop and closed-loop control unit 12 and an electrically controllable pressure modulation device for setting wheel-specific brake pressures.

The brake modulation device (not denoted here in more detail) comprises, for example, per wheel brake 8, 9, 10, 11 of a motor vehicle which is not illustrated, an inlet valve 6*a*-6*d* and an outlet valve 7*a*-7*d*, which are hydraulically connected in pairs to one another via center ports and to the wheel brakes 8, 9, 10, 11. The inlet ports of the inlet valves 6*a*-6*d* are supplied, by means of brake circuit supply lines 13*a*, 13*b*, with pressures which in a "brake-by-wire" operating mode are derived from a system pressure which is present in a system pressure line 38 which is connected to a pressure space 37 of the electrically controllable pressure supply device 5. Connected in parallel with each of the inlet valves 6*a*-6*d* is a non-return valve 50*a*-50*d* which opens toward the brake circuit supply lines 13*a*, 13*b*. In a non-boosted fallback operating mode, the brake circuit supply lines 13*a*, 13*b* are supplied with the pressures of the pressure spaces 17, 18 of the activation unit 2 via hydraulic lines 22*a*, 22*b*. The outlet ports of the outlet valves 7*a*-7*d* are connected in pairs to the pressure medium reservoir container 4 via return flow lines 14*a*, 14*b*. In order to detect the pressure present in the system pressure line 38, a pressure sensor 19 which is of preferably redundant design is provided.

The hydraulic activation unit 2 has, in a housing 21, two pistons 15, 16 which are arranged one behind the other and which bound hydraulic chambers or pressure spaces 17, 18 which form, together with the pistons 15, 16, a dual-circuit master brake cylinder or a tandem master cylinder. The pressure spaces 17, 18 are connected, on the one hand, to the pressure medium reservoir container 4, via radial bores formed in the pistons 15, 16 and corresponding pressure equalization lines 41*a*, 41*b* (via the return flow line 14*a* and 14*b*) wherein said bores and lines 41*a*, 41*b* can be shut off by a relative movement of the pistons 17, 18 in the housing 21 and, on the other hand, to the already specified brake circuit supply lines 13*a*, 13*b* by means of the hydraulic lines 22*a*, 22*b*. In this context, a parallel connection of a diagnostic valve 28 which is open in the currentless state, with a non-return valve 27 which closes toward the pressure medium reservoir container 4, is contained in the pressure equalization line 41*a*. The pressure spaces 17, 18 accommodate resetting springs (not denoted in more detail) which position the pistons 15, 16 in an initial position when the master brake cylinder 2 is not activated. A piston rod 24 couples the pivoting movement of the brake pedal 1 owing to a pedal activation to the translatory movement of the first (master cylinder) piston 15 whose activation travel is detected by a travel sensor 25, preferably of redundant design. The corresponding piston travel signal is as a result a measure of the brake pedal activation angle. It represents a braking request of a vehicle driver.

An isolating valve 23*a*, 23*b* is arranged in each of the line sections 22*a*, 22*b* connected to the pressure spaces 17, 18, which isolating valve 23*a*, 23*b* is embodied as an electrically activated 2/2-way valve which is preferably open in the currentless state. The hydraulic connection between the pressure spaces 17, 18 and the brake circuit supply lines 13*a*, 13*b* can be shut off by means of the isolating valves 23*a*, 23*b*. A pressure sensor 20 which is connected to the line section 22*b* detects the pressure built up in the pressure space 18 as a result of displacement of the second piston 16.

The travel simulator 3 can be hydraulically coupled to the master brake cylinder 2 and is composed essentially of a simulator chamber 29, a simulator spring chamber 30 and a simulator piston 31 which disconnects the two chambers 29, 30 from one another. The simulator piston 31 is supported on the housing 21 by an elastic element (for example a spring) which is arranged in the simulator spring chamber 30 and is advantageously prestressed. The simulator chamber 29 can be connected to the first pressure space 17 of the tandem master brake cylinder 2 by means of an electrically activated simulator release valve 32. When a pedal force is predefined and the simulator release valve 32 is activated, pressure medium flows from the master brake cylinder pressure space 17 into the simulator chamber 29. A non-return valve 34 which is arranged hydraulically in an anti-parallel fashion with respect to the simulator release valve 32 permits, independently of the switched state of the simulator release valve 32, approximately unimpeded flowing back of the pressure medium from the simulator chamber 29 to the master brake cylinder pressure space 17.

The electrically controllable pressure supply device 5 is embodied as a hydraulic cylinder-piston arrangement or a single-circuit electrohydraulic actuator whose piston 36 can be activated by a schematically indicated electric motor 35 with intermediate connection of a rotational translatory gear mechanism (also illustrated schematically). A rotor position sensor which serves to detect the rotor position of the electric motor 35 and is indicated in a merely schematic fashion is denoted by the reference symbol 44. In addition, a temperature sensor can also be used to sense the temperature of the motor winding. The piston 36 bounds a pressure space 37.

The actuator pressure which is generated by the force effect of the piston 36 on the pressure medium which is enclosed in the pressure space 37 is fed into the system pressure line 38 and detected by the system pressure sensor 19. In the "brake-by-wire" operating mode, the system pressure line 38 is connected to the brake circuit supply lines 13*a*, 13*b* via the sequence valves 26*a*, 26*b*. In this way, in the case of normal braking, wheel brake pressure is built up and reduced for all the wheel brakes 8, 9, 10, 11. When pressure is reduced, the pressure medium which has been previously moved into the wheel brakes 8, 9, 10, 11 from the pressure space 37 of the actuator 5 flows back again into the pressure space 37 of the actuator 5 in the same way. In contrast, in the case of braking with wheel brake pressures which are regulated differently on a wheel-specific basis using the modulation valves 6*a*-6*d*, 7*a*-7*d*, the pressure medium portion which is discharged via the outlet valves 7*a*-7*d* flows into the pressure medium reservoir container 4. Subsequent sucking of pressure medium into the pressure space 37 is possible as a result of the piston 36 moving back with the sequence valves 26*a*, 26*b* closed, by virtue of the fact that pressure medium can flow out of the container 4 into the actuator pressure space 37 via a suction valve 52 which is embodied as a non-return valve which is open in the direction of flow to the actuator.

The components 2, 3, 5, 6*a*-6*d*, 7*a*-7*d*, 12, 19, 20, 22*a*, 22*b*, 23*a*, 23*b*, 25, 26*a*, 26*b*, 27, 28, 32, 34, 38, 41*a*, 41*b*, 44, 46, 52 mentioned above are preferably combined to form an electrohydraulic module (electrohydraulic activation unit) which is provided with the reference symbol 60. The electronic open-loop and closed-loop control unit 12 is used for actuating the electrically activated components of the module 60, in particular the valves 6*a*-6*d*, 7*a*-7*d*, 23*a*, 23*b*, 26*a*, 26*b*, 28, 32 and of the electric motor 35 of the pressure supply device 5. The signals of the sensors 19, 20, 25 and 44 are also processed in the electronic open-loop and closed-loop control unit 12.

In a normal braking function of the brake system ("brake-by-wire" operating mode), the master brake cylinder 2, and therefore the vehicle driver, is disconnected from the wheel brakes 8, 9, 10, 11 by the closed isolating valves 23*a*, 23*b*, and the brake circuit supply lines 13*a*, 13*b* are connected via the opened sequence valves 26*a*, 26*b* to the first pressure supply device 5 which makes available the system pressure for the activation of the wheel brakes 8, 9, 10, 11. The simulation device 3 is activated by the opened simulator release valve 32, so that the pressure medium volume which is expelled in the master brake cylinder 2 as a result of the activation of the brake pedal 1 by the driver is taken up by the simulation device 3, and the simulation device 3 communicates a customary brake pedal sensation to the vehicle driver.

In a fallback operating mode of the brake system, for example in the event of a failure of the electrical energy supply of the brake system, the simulation device 3 is switched off by the simulator release valve 32 which is closed in a currentless state, and the pressure supply device 5 is disconnected from the brake circuit supply lines 13a, 13b by the sequence valves 26a, 26b which are closed in the currentless state. The master brake cylinder 2 is connected via the lines 22a, 22b to the isolating to valves 23a, 23b, open in the currentless state, by the brake circuit supply lines 13a, 13b, and therefore to the wheel brakes 8, 9, 10, 11, so that the vehicle driver can build up pressure directly in the wheel brakes 8, 9, 10, 11 by activating the brake pedal 1.

In a simulator brake system (in the "brake-by-wire" operating mode), the pedal 1 is hydraulically disconnected from the wheel brakes 8-11. The pedal reactions which are unavoidable in conventional brake systems during wheel brake pressure regulating activities of the brake system therefore do not occur. In order nevertheless to provide the driver with haptic pedal feedback in selected operating states, it is proposed, for example, that this pedal reaction be superimposed temporarily under electronic control on the pedal characteristic which is predefined by the simulator (for example by means of the spring in the space 30).

In order to carry out a method for generating an electronically controlled pedal reaction, for example at least one isolating valve (23a: isolating valve of the pressure circuit, 23b: isolating valve of the floating circuit) is opened in a pulsed fashion. As a result, a pressure medium volume pulse is conducted from the system pressure side (line 13a or 13b) of the isolating valve to the driver's pressure side (line 22a or 22b) of the isolating valve which generates the desired pedal pulsation.

The method preferably provides that the system pressure is raised (for example by means of the pressure supply device 5) if the pressure difference composed of the system pressure and master cylinder pressure is not sufficient, not present or is negative.

Finally, the isolating valve 23b which is assigned to the floating circuit is preferably used to generate the pedal reaction. This has the advantage that after the pressure medium volume which is additionally introduced as a volume pulse has fulfilled its function as a pedal pulse generator it is reduced again via the equalization connection 100 of the floating circuit in the direction of the container 4, and the steady-state pedal characteristic therefore remains unchanged.

Figure 2:
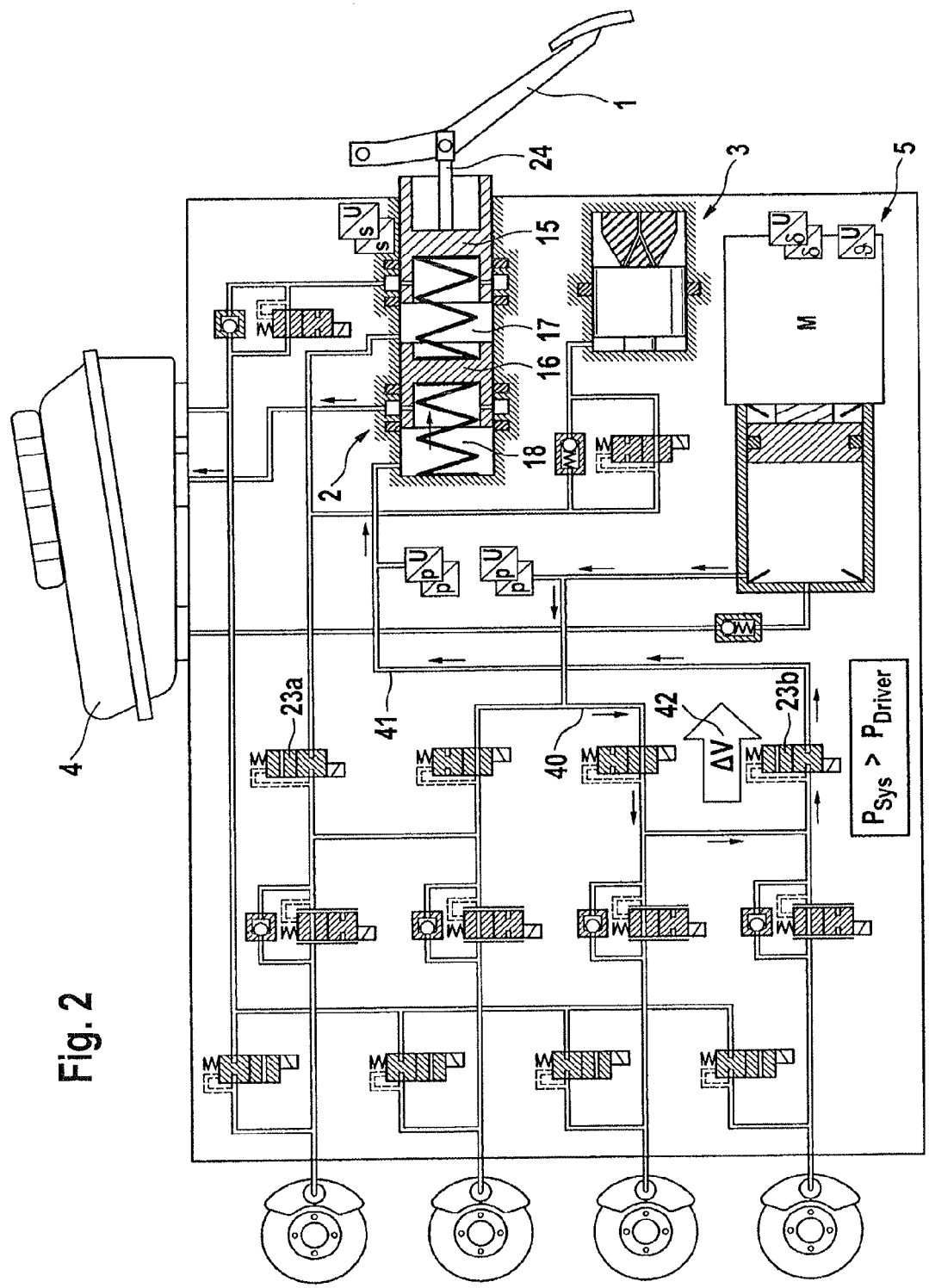
FIG. 2 shows the brake system according to FIG. 1 in a first state in order to clarify the method according to an aspect of the invention.
Figure 3:
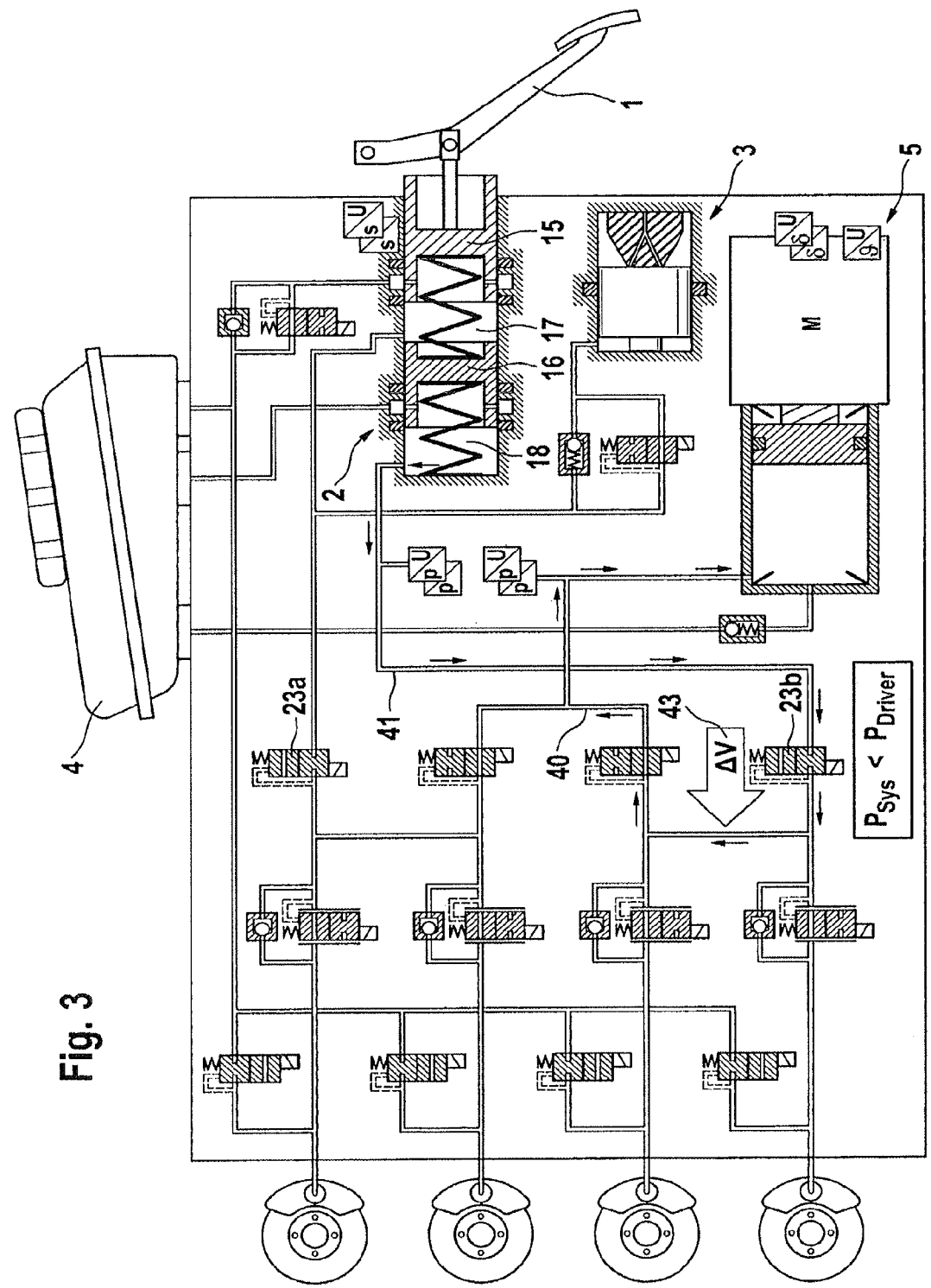
FIG. 3 shows the brake system according to FIG. 1 in a second state in order to clarify the method according to an aspect of the invention.

FIG. 2 and FIG. 3 illustrate the brake system in FIG. 1 in various states. Volume flows and pressure conditions which are relevant for the function are illustrated by way of example in FIG. 2 and FIG. 3.

In the case of normal braking without ABS and in the case of ABS braking ("brake-by-wire" operating mode), a state such as is illustrated in FIG. 2 frequently occurs. The system pressure $P_{sys}$ in the system pressure circuit 40 is higher than the driver pressure $P_{Driver}$ in the driver pressure circuit 41 since the system pressure is usually increased by an order of magnitude compared to the unboosted driver pressure.

The brake pedal feedback is generated, for example, using the isolating valve 23b which is continuously energized, and therefore closed during braking in the case of a normal, active operating mode of the brake system. The isolating valve 23b disconnects the driver pressure circuit 41 from the system pressure circuit 40 here in the active operating mode with the result that brake fluid volume and pressure cannot flow from one circuit in the respective other circuit. Without the exemplary method which is described below for setting a suitable haptic brake pedal feedback for the driver in an active brake system during ABS control, the driver would therefore also be disconnected from the active system pressure or the wheel brake circuits during ABS control and would not obtain any haptic feedback via the brake pedal 1. In contemporary, conventional ABS/ESC brake systems (for example with a vacuum brake booster and feedback pump) the driver senses the ABS pressure fluctuations in the brake pedal 1 during ABS control owing to feedback pump strokes and valve switching.

As has already been explained in relation to FIG. 1, in order to generate haptic brake pedal feedback during ABS braking in an active brake system a pressure or volume pulse $\Delta V$ 42 is preferably fed from the system pressure circuit 40 into the driver pressure circuit 41 by briefly opening the isolating valve 23b. Said pressure pulse or volume pulse $\Delta V$ 42 generates a force pulse acting on the floating piston 16, which passes on the force pulse via the first return spring, arranged in the first pressure space of the master brake cylinder, and the brake fluid in the first pressure space 17 to the first piston 15 via the pressure rod 24 to the brake pedal 1 and therefore to the driver's foot which is located thereon during the braking. As a result, by briefly opening the isolating valve 23b a pressure pulse or volume pulse $\Delta V$, and as a result thereof, a force pulse acting on the brake pedal 1 or the driver's foot is generated. The driver therefore feels in his foot a force pulse and the driver's foot is as a result moved dynamically by several mm or fractions of mm since the pedal opposing force of the driver's foot force is overcome by the force pulse. A haptic feedback via the brake pedal 1 is therefore possible without the pedal basic characteristic being changed.

The intensity of the force pulse is preferably varied over the opening time of the isolating valve 23b since in this way the size of the volume pulse $\Delta\Delta V$ 42 is determined.

Furthermore, the frequency of the force pulses in the pedal is preferably varied by varying the pause time between the valve openings.

In order to make the haptic feedback suitable and subject to be plausible for the driver, the frequency and intensity of the feedback are preferably set or varied suitably.

According to one development of the method according to the invention, the frequency and intensity of the brake pedal feedback are adapted to the frequencies and amplitudes of the wheel brake pressure modulations in the wheel brake circuit.

The ABS pressure modulations at all the wheel brakes are preferably taken into account for this purpose.

The frequency of the brake pedal feedback is preferably selected as a function of a duration of one or more ABS pressure build up cycles up to the ABS pressure reduction.

In the case of a relatively high ABS control frequency of the pressures in the wheel pressure circuits of the active system, a relatively high frequency of the volume pulses $\Delta V$ for the brake pedal feedback is set. This results in a plausible relationship between the behavior of the vehicle or ABS control and the haptic pedal feedback for the driver.

In terms of vehicle movement dynamics it can be particularly valuable for the driver to know if he has reached the adhesion limit of the tires to the road when the vehicle is being braked, that is to say whether he has reached entry into the ABS control. It is therefore possible, for example, for the coefficient of friction $\mu$ of the carriageway to be determined by the driver in wet or winter road conditions by braking as far as the ABS control since this estimation of the coefficient of friction $\mu$ of the carriageway is only possible with difficulty by visual assessment and this can also vary greatly. Furthermore, this is appropriate also to communicate the adhesion limit of the tires to the driver in the case of cornering with braking by communicating the entry into the ABS control. It is therefore possible for the haptic brake pedal feedback to be particularly important for the driver when ABS control is entered. For example, for the start of ABS control the brake pedal feedback has a relatively high frequency and is activated with suitable intensity in order to communicate the entry into ABS in an optimum way to the driver. For example, specifically for ABS entry in the case of cornering with braking the brake pedal feedback also has a relatively high frequency and is activated with a suitably high intensity.

This ensures that the driver can learn an assignment of the pulsation to the driving state and is therefore able to draw conclusions about the operating state of his vehicle from the pedal behavior.

In the case of ABS braking at a low coefficient of friction μ of the carriageway or at a very high activation force of the driver on the brake pedal, a state (pressure relationship) which is illustrated in FIG. 3 can result. In this context, the system pressure $P_{sys}$ in the system pressure circuit 40 is lower than the driver pressure $P_{Driver}$ in the driver pressure circuit 41. As a result, opening of the isolating valve 23*b* causes a volume pulse ΔV 43 to flow from the driver pressure circuit 41 into the system pressure circuit 40. Since the brake fluid volume flows pulse by pulse from the driver pressure circuit 41 into the system pressure circuit 40, in this context as a result of the driver's foot force on the brake pedal on the floating piston 16, the primary piston 15 and therefore the brake pedal 1 would move further and drop in the activation direction. This could unjustifiably give the impression of a defect in the brake system to the driver. Furthermore, a drop in brake pedal in the case of failure of the active system, that is to say switching over into the hydraulic fallback level (in which all the electromagnetic valves are non-energized) could bring about a safety-critical state of the vehicle since when the brake pedal is already depressed there would be no or very little brake fluid volume available in the master brake cylinder as a reserve for the now active fallback level.

In the situation illustrated in FIG. 3, the system pressure is therefore preferably raised above the value of the driver pressure (by means of the pressure supply device). The system pressure is therefore not kept at the level of the greatest ABS wheel pressure request but instead raised above the value of the driver pressure in order to achieve a volume flow, as illustrated in FIG. 2 from the system pressure circuit 40 into the driver pressure circuit 41, and therefore prevent dropping of the brake pedal 1.

An advantage of the invention is that no additional actuation system such as, for example, an additional actuator is required in the pedal simulator unit or on the brake pedal for the function of the haptic brake pedal feedback. This function can be implemented purely by means of software in the system which is shown by way of example in FIG. 1.

The invention claimed is:

1. A method for providing haptic information to the driver of a motor vehicle, which is equipped with a brake-by-wire brake system, about an operating state of the brake system, the method comprising:
   generating a brake pedal characteristic in the form of a functional relationship between an opposing force of the brake pedal and travel of the brake pedal, and
   modifying the brake pedal characteristic as a function of the operating state of the brake system,
   wherein the brake pedal characteristic is generated by a passive simulator spring which assigns a pedal travel to a given pedal force in an unchangingly constant relationship during normal operation of the brake system, on which pedal travel a pedal return travel which transports the haptic information is superimposed.

2. The method as claimed in claim 1, wherein the superimposition of the haptic information is reversible, with the result that after the ending or switching off thereof the brake pedal characteristic is restored automatically and without an actuating intervention.

3. The method as claimed in claim 2, wherein the superimposition of the haptic information is composed of chronologically limited individual events which can be perceived by the driver as pedal return pulses.

4. The method as claimed in claim 3, wherein a plurality of pedal return pulses are arranged in a chronologically successive fashion, with the result that a periodic pedal pulsation which is superimposed on the brake pedal characteristic is produced.

5. The method as claimed in claim 3, wherein an isolating valve of a hydraulic brake-by-wire brake system is opened temporarily in order to generate a pulse.

6. The method as claimed in claim 5, wherein in order to generate a pulse the by-wire brake system pressure is increased before the isolating valve is opened.

7. A method for providing haptic information to the driver of a motor vehicle, which is equipped with a brake-by-wire brake system, about an operating state of the brake system, the method comprising:
   generating a brake pedal characteristic in the form of a functional relationship between an opposing force of the brake pedal and travel of the brake pedal, by a simulator, and
   modifying the brake pedal characteristic as a function of the operating state of the brake system,
   wherein a basic brake pedal characteristic is generated by a passive simulator spring which assigns a pedal travel to a given pedal force in an unchangingly constant relationship, on which pedal travel a pedal return travel which transports the haptic information is superimposed,
   wherein the superimposition of the haptic information is reversible, with the result that after the ending or switching off thereof the basic brake pedal characteristic is restored automatically and without an actuating intervention,
   wherein the superimposition of the haptic information is composed of chronologically limited individual events which can be perceived by the driver as pedal return pulses,
   wherein a plurality of pedal return pulses are arranged in a chronologically successive fashion, with the result that a periodic pedal pulsation which is superimposed on the basic brake pedal characteristic is produced, and
   wherein the frequency, intensity and pulse period of the periodic pedal pulsation are selected as a function of the operating state of the brake system and of the vehicle.

8. The method as claimed in claim 7, wherein the frequency and intensity of the brake pedal reaction are selected as a function of parameters of a wheel brake pressure modulation such as control frequency, intensity and duration.

9. The method as claimed in claim 8, wherein at the start of a wheel brake pressure modulation a higher frequency of the pedal pulsation is selected than in the further course thereof, and wherein during cornering the intensity of the pulsation is additionally increased.

10. The method as claimed in claim 9, wherein the assignment of the frequency and intensity of the periodic pedal pulsation to the operating state of the vehicle and brake system is selected in a reproducible fashion.

11. A brake-by-wire brake system which is configured hydraulically and which is configured to operate in a brake-by-wire operating mode and to operate in a further, non-electronic operating mode with direct hydraulic access from a brake pedal to wheel brakes and configured to carry out a method comprising:
   generating a brake pedal characteristic in the form of a functional relationship between an opposing force of the brake pedal and travel of the brake pedal, by a simulator, and
   modifying the brake pedal characteristic as a function of an operating state of the brake system,
   wherein a basic brake pedal characteristic is generated by a passive simulator spring which assigns a pedal travel to a given pedal force in an unchangingly constant relationship, on which pedal travel a pedal return travel which provides haptic information is superimposed.

12. The system as claimed in claim 11, wherein the pedal force and simulator spring force as well as the brake travel and simulator spring travel in the brake-by-wire operating mode are coupled to one another via a first hydraulic circuit.

13. The system as claimed in claim 11, wherein the pedal return travel which is superimposed on the basic brake pedal characteristic is generated by a second hydraulic circuit.

14. The system as claimed in claim 13, wherein the first and second hydraulic circuits are assigned two pressure spaces of a tandem master brake cylinder.

15. The system as claimed in claim 14, further comprising:
   a first and a second isolating valve with which the two pressure spaces of the tandem master brake cylinder are isolated from the wheel brakes in the brake-by-wire operating mode, and
   a device for making available a by-wire brake system pressure and a pressure medium volume; and
   wheel brake pressure regulating devices for generating wheel-specific wheel brake pressures from the brake system pressure.

* * * * *